Dec. 5, 1933.   H. HUEBER   1,938,559
AUTOMOBILE HEATER
Filed Dec. 30, 1929
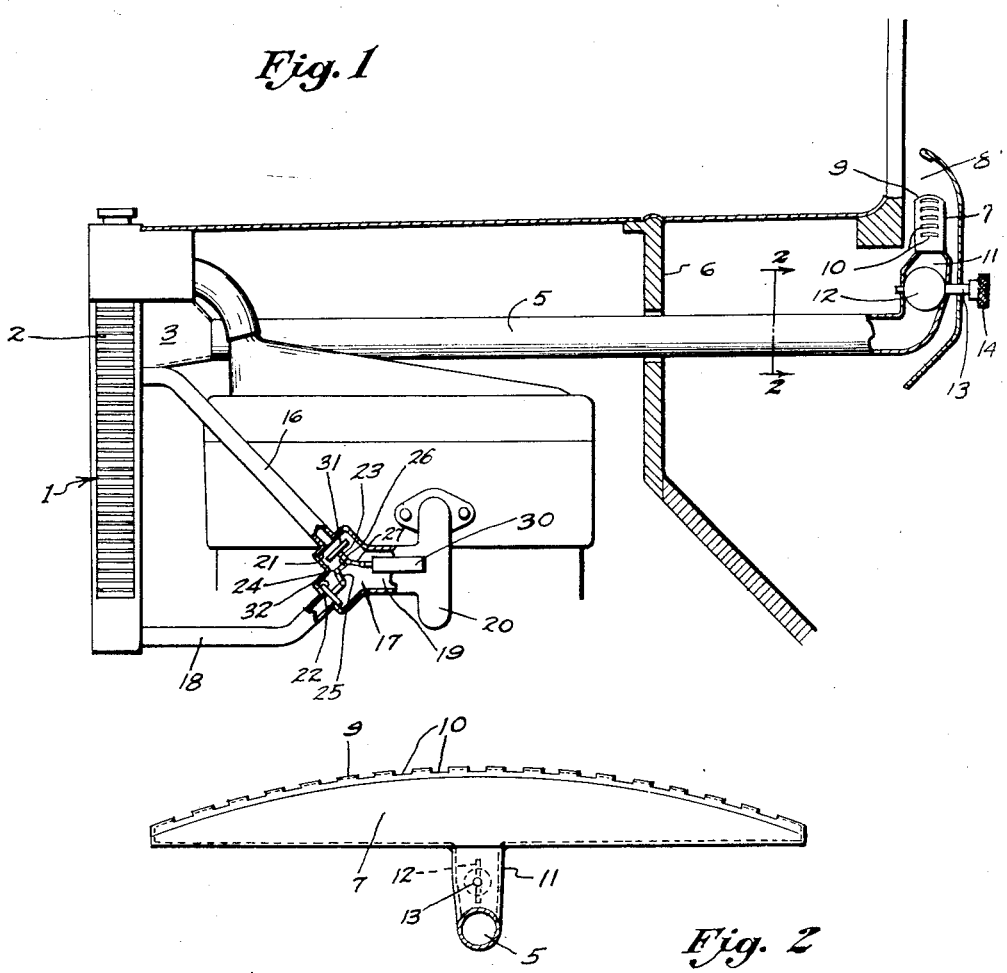
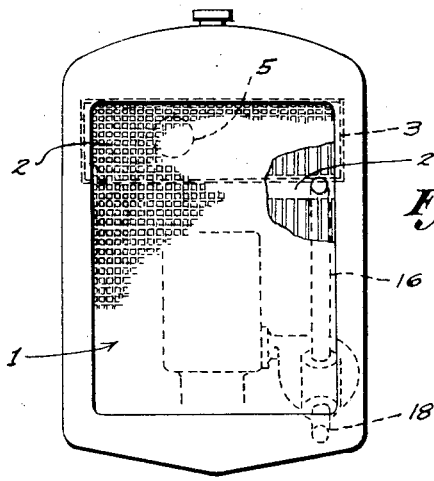
Inventor
Henry Hueber
by Barton A. Beanf
Attorney Patented Dec. 5, 1933

1,938,559

UNITED STATES PATENT OFFICE 1,938,559

AUTOMOBILE HEATER

Henry Hueber, Buffalo, N. Y., assignor to Trico Products Corporation, Buffalo, N. Y.

Application December 30, 1929
Serial No. 417,456

8 Claims. (Cl. 123—174)

This invention relates to heating devices for automobiles and particularly to such devices receiving their heat supply direct from the radiator of the automobile.

Prior to this invention automobile heaters have usually received their heat supply from the exhaust manifold, either by an induced or a direct method. Both of such methods have the inherent disadvantage of supplying the occupants with tainted air, both injurious and annoying to the occupants. The induced method usually takes its air from within the hood of the automobile and receives the obnoxious motor odors, and the direct method directly taps the exhaust gases wherefrom it is conveyed to a radiator within the car. Any break in this system permits the escape of the dangerous carbon monoxide into the car.

The present invention aims to overcome the foregoing disadvantages and to take its air supply directly from the radiator air stream, thereby insuring a supply of fresh heated air to the interior of the car at all times during the operation of the heater.

An object of this invention is to connect a dispenser for receiving a heated air supply to a special heat supplying portion of a radiator.

Another object of this invention is to provide a thermal control means for insuring maximum heating efficiency of such heat supplying portion at all operating periods, and for expeditiously bringing the heater into full functioning during the initial operating period of the motor vehicle.

Another object is to provide a circulation system for a radiator controlled by a thermal means for restricting the active size of the radiator during the initial engine operation.

The invention will further be found to reside in the salient features of construction and the arrangements and combinations of parts whereby the heat conducting means may be efficiently mounted in an automobile.

In the accompanying drawing:—

Fig. 1 is a longitudinal section through an automobile, with the heat conducting means and associated parts shown only partially sectioned.

Fig. 2 is a section on the line 2—2 of Fig. 1.

Fig. 3 is a front view of the radiator of the automobile including a dotted showing of the heat conducting means and associated parts.

Proceeding in accordance with the present invention the numeral 1 designates an automobile radiator, the upper section 2 of which is shown provided with a funnel portion 3 mounted rearwardly thereof. The said funnel portion is connected to an air dispenser by a hollow conduit 5 which extends rearwardly of said funnel portion through the partition 6 to the interior of the car where it is connected in a suitable manner to the dispenser 7. It is preferred that the said dispenser be mounted within the lower portion 8 of the windshield frame whereby it may direct the heated air against the windshield for removal of ice or sleet from the same, and thus be utilized as a windshield heater as well as a car heater.

As shown in detail in Fig. 2, the dispenser comprises an elongated hollow body having an arcuate top 9, in which are provided a number of spaced apertures 10, which act as air directing nozzles as hereinafter described. Interposed in the conduit is a valve body 11 which contains a butterfly valve 12, suitably mounted therein on the shaft 13 and operated by a knob 14, which is secured to the protruding portion of the shaft 13.

It is desired that the section 2 of the radiator may at all operating periods be at substantially the same temperature, and that such temperature may be at approximately the highest ideal working temperature for the motor. It is also desired that upon starting a cold motor, that the said section receive the full supply of heated fluid, thus causing a rapid rise in temperature with the dual advantages of rapid functioning of the heater and quick efficient functioning of the motor.

These objects have been accomplished by tapping the radiator immediately below the said section with a shunting passage or pipe 16 which leads into a control chamber 17 hereinafter described. An outflow pipe 18 taps the bottom of the radiator and may be the standard outlet passage usually used on radiators. The fluid flow through both of said pipes is controlled from the said control chamber, which comprises a casting having a throat 19 which feeds the water pump 20 which in the present showing is integral with the control chamber. The control or bypass chamber is in the form of a Y and contains valve seats 21 and 22 which lead into the pipes 16 and 18 respectively.

A valve action capable of covering one seat and simultaneously uncovering the remaining seat for complementary action is provided and comprises a bell crank 23 having a pivot 24 mounted near the apex of the Y and having arms 25 and 26, the latter arm being connected to a link 27 which in turn is connected to the thermal control member 30 of a preferred design. Valves 31 and 32 are connected to the arms 26 and 25, respectively, and are adapted upon actuation of the bell crank 23 to cover their underlying seats and control the flow from the pipes 16 and 18, such operation being hereinafter more fully described.

In operation the section 2 of the radiator is maintained at a uniform high temperature by the controlled complementary flow through the pipes 16 and 18. For example, upon the starting of a cold motor, the thermal control member will be in its inactive position, as shown in Fig. 1, and, through the link and bell crank system, the valve 32 will be engaged upon the seat 22 thus closing the pipe 18 to the pump flow. The bell crank simultaneously maintains the accompanying valve 31 away from its seat 21 allowing the fluid from the section 2 to discharge through the pipe 16 for circulation through the engine, the result of which will cause a rapid rise in temperature of the fluid, thereby rendering the heater effective in a short time. Such rise in temperature affects the thermal control member in the usual manner to gradually open the valve 32 and close the valve 31, to direct the radiator flow through the pipe 18, and short circuit the pipe 16, until, when the proper operating temperature of the water is reached, the full flow of the radiator will be delivered through the pipe 18 in the usual radiator manner.

Upon operation of the heater, wherein the butterfly valve 12 is opened by the knob 14, an air stream will be forced through the section 2, through the conduit 5, and finally through the dispenser 7 to the interior of the car. This will result in a partial cooling of the said section and the immediate actuation of the thermal control member to direct more fluid through the pipe 16 to accordingly maintain the high temperature in the said section. The thermal control member is at all operating periods responsive to the heat of the fluid, and is indirectly affected by the speed of the vehicle, outside temperature, and the opening or closing of the heater.

It will be understood that the flow control through the pipes 16 and 18 may be of any suitable or standard design which may accomplish the thermal control previously described and shown diagrammatically in Fig. 1. It will also be noted that the size of the section and the disposal of the dispenser 7 may be varied without departing from the spirit of the invention.

The radiator may be of a preferred type, although in Fig. 3 the upper section 2 has been illustrated as being separated from the lower portion by a specially defined horizontal passage indicated at 2′ and into which the shunting pipe 16 opens.

It will be understood that the velocity of the air passing through the upper section of the radiator and through the funnel 3 and conduit 5 may be controlled by the valve means 12, 14 so that such air may be caused to move through the upper section of the radiator at a speed sufficiently slow to allow it to become heated to the desired temperature.

What is claimed is:

1. A heat-exchange system for a vehicle including an engine and a portion of the vehicle to be heated, comprising a fluid cooling radiator for the engine and a fluid circuit therefor, an air conduit between said radiator and the portion of the vehicle to be heated, said conduit being in communication with a portion only of said radiator for conducting air passing through said portion of the radiator to the portion of the vehicle to be heated for heating the latter, a by-pass connection in said circuit controlled by valve means, whereby the cooling of circulating fluid may be confined either to said portion of the radiator or to the whole of said radiator.

2. A heat exchange system for a vehicle including a compartment therein and an engine, comprising a fluid cooling radiator for the engine and means for conducting fluid in circuit between the radiator and engine, a conduit extending between the radiator and said compartment, said conduit being in communication with a portion only of the radiator for conducting air passing through the radiator into said compartment, and valved by-pass means in the fluid conducting means for restricting the flow of fluid through other portions of said radiator or for causing substantially all of said fluid to flow through the entire radiator.

3. A heat exchange system for an automobile including an engine and a part of the automobile to be heated, comprising a cooling radiator for the motor and means for conducting fluid in circuit between the radiator and motor, means for conducting heat from the radiator to said part of the automobile, said means being in communication with a portion only of the radiator, and a by-pass connection in the fluid circuit means controlled by thermostatically operated valve means for varying the amount of said fluid passing through other portions of said radiator.

4. In a heat exchange system for a vehicle having an engine, a cooling radiator, and a circuit for fluid between the engine and radiator, said radiator having a pair of sections arranged in series along the fluid circuit, a by-pass connection in said circuit extending from the juncture of said sections to the engine, and thermostatic valve means controlling said by-pass connection for confining the circulating fluid to one or both of said sections.

5. In a heat exchange system for a vehicle including an engine and a part to be heated, comprising a cooling radiator and a circuit for fluid between the engine and radiator, said radiator having a pair of sections in said circuit, a by-pass connection extending from the juncture of said sections to the engine, thermostatic valve means controlling said by-pass connection for confining the circulating fluid to one or both of said sections, an air conduit between said radiator and the part to be heated, said conduit being in communication with said one of the sections only, for conducting air passing through said one of the sections to the part to be heated.

6. A heat exchange system for an automobile, including an engine and a passenger compartment, a cooling radiator for the engine and circuit therefor, an air conduit between said radiator and said passenger compartment, said conduit being in communication with a portion only of the radiator for conducting air passing through said radiator portion to the passenger compartment, and a by-pass connection in said circuit controlled by thermostatically operated valve means whereby the cooling of circulating fluid may be confined either to said portion or the whole of the radiator.

7. In a heat exchange system for a motor vehicle having a portion to be heated, an engine and a cooling radiator therefor, said radiator having inlet and outlet passages for engine cooling fluid, said inlet passage being connected to said engine, a by-pass connected to said radiator between said inlet and outlet passages, said bypass and said outlet passage being connected to a valve body in communication with said engine, whereby fluid from said engine may circulate through said inlet passage and through a portion of the radiator and return to the engine through said by-pass or may pass through said radiator and return to the engine through the outlet passage, said valve body having a pair of valves therein adapted to alternately close and open communication through said by-pass and said outlet passage, and thermally controlled means for controlling said valves to automatically apportion the flow from the radiator through the shunt and outlet passages to maintain the section of the radiator between the inlet and by-pass at a substantially high temperature, and a conduit between said radiator and the portion of the vehicle to be heated, said conduit being in communication with the portion of the radiator between the inlet and by-pass only, for conducting air passing through said radiator portion to the portion of the vehicle to be heated for heating said portion of the vehicle.

8. In a heat exchange system for a vehicle having a portion to be heated, an engine and a cooling radiator therefor, said radiator having inlet and outlet passages for respectively conducting fluid from said engine to said radiator and returning it from the radiator to the engine, a by-pass connected to one of said first-named passages and to the radiator between said passages, valve means associated with said by-pass and the one of the first mentioned passages to which said by-pass is connected whereby fluid from the engine may circulate through the entire radiator or through the section of the radiator between said by-pass and the other of said first mentioned passages, a conduit between the radiator and the portion of the vehicle to be heated, said conduit being in communication with said last mentioned section only of the radiator for conducting air passing through said last mentioned section to the portion of the vehicle to be heated for heating it, and thermal control means for controlling the action of the valve means to automatically apportion the flow of fluid through the sections of the radiator to maintain a predetermined temperature in said last mentioned section.

HENRY HUEBER.